Patented Dec. 18, 1951

2,579,251

UNITED STATES PATENT OFFICE 2,579,251

MANUFACTURE OF ALUMINUM ALKOXIDES

Arnold C. Coates, Hillingdon, and Leonard Saunders, Loudwater, England, assignors to The British Aluminum Company Limited, London, England, a company of Great Britain No Drawing. Application January 25, 1949, Serial No. 72,764. In Great Britain January 27, 1948

17 Claims. (Cl. 260—448)

This invention relates to the manufacture of aluminum alkoxides in a very pure state.

The preparation of aluminum alkoxides by reacting metallic aluminum with liquid alcohols in the presence of a suitable catalyst is well known. However, the large scale production of such alkoxides is always a matter of some difficulty. The more expensive higher alcohols react fairly completely with aluminum and its alloys in the presence of a catalyst when heated to their boiling point, but the cheaper and more readily available alcohols, such as ethyl alcohol, react only slowly and incompletely, even in the presence of catalysts, due probably to the inhibiting action of the layer of the relatively insoluble alkoxide initially formed on the surface of the metal.

Moreover, aluminum alkoxides prepared by the interaction of liquid alcohol and an aluminum alloy or impure aluminum must be separated from the unattacked residue of alloying constituents or impurities deriving from the metal or alloy used in their preparation. This residue is generally so finely divided that separation of the alkoxide therefrom by filtration is precluded and distillation must usually be employed, although this operation is itself difficult to carry out on a large scale owing to the high melting points and boiling points of the compounds.

In the previously proposed methods of preparing aluminum alkoxides, using liquid alcohol and requiring subsequent purification of the product, various catalysts for the reaction have been mentioned, e. g. iodine, mercuric chloride, ferric chloride, stannic chloride and boron trioxide.

We have now discovered, and our invention broadly consists in, an improved method of preparing aluminum alkoxides by reacting alcohol vapours with aluminum-bearing materials in the presence of a suitable catalyst, the aluminum alkoxides appearing in the vapour phase immediately they are formed.

The aluminum-bearing materials are preferably comminuted and must generally be heated. The alkoxide vapours may be discharged into a suitable receiver, in which they may be condensed, or, alternatively, hydrolysed directly to yield finely divided hydrate of alumina. When proceeding in accordance with this invention, the lower alcohols, e. g. ethyl alcohol, react as readily as the higher alcohols.

The expression "aluminum-bearing materials" wherever employed herein is intended to include both pure and impure aluminum, as well as aluminum alloys and mixed alloy scrap, and the expression "alcohol vapours" means any vaporised alcohol whether normal, secondary, iso or tertiary.

The alcohol vapour is preferably carried forward in a stream of nitrogen or hydrogen.

The reaction may be carried out under reduced pressure, atmospheric pressure or under pressures greater than atmospheric, according to the nature and properties of the alkoxide to be produced. Reduced pressure may be employed to facilitate the distillation of the product, but with ethyl alcohol the reaction may equally well be carried out at atmospheric pressure. In this case, the optimum reaction temperature is 200°–300° C. The aluminum ethoxide produced sublimes over as a heavy white smoke.

Owing to their volatility some of the catalysts usually employed in the known methods of carrying out the alcohol-aluminum reaction are not particularly suitable for the process according to the present invention. However, we have found that anhydrous cupric chloride is an excellent catalyst for use in the latter.

An advantage of the present invention is that the method can be carried out in a continuous manner, the alcohol vapour being passed in counter-current to the aluminum-bearing material as this is advanced through a reaction space.

Another advantage is that when using impure aluminum or an alloy or mixed alloy scrap, there is no need for a second step, whether distillation or filtration, for separating the aluminum alkoxide from the unattacked metals associated with the aluminum-bearing material.

An important additional feature of this invention is that very fine "ion-free" hydrate of alumina may be prepared directly from the alkoxide vapour or smoke by blowing steam into the vessel into which the vapour or smoke is delivered from the reaction space. The alcohol liberated can be recovered by fractional distillation and returned to the process.

In one example of the way in which the invention may be carried into effect, an aluminum-copper alloy in a finely divided state, mixed with a little anhydrous cupric chloride, is fed into one end of a reaction vessel heated to 200°–300° C. and traversed through the vessel by means of a device such as a helical screw. Ethyl alcohol vapour at atmospheric pressure and carried in a stream of nitrogen is passed into the other end of the vessel to flow in counter-current to the metal. By suitably controlling the rates of feed of both the metal and the alcohol vapour, it is arranged that pure aluminum ethoxide distils over at the outlet end of the reaction vessel, the unreacted copper being discharged from the opposite end thereof.

We claim:

1. A method of preparing aluminum ethoxide which consists in reacting the vapour of ethyl alcohol with a finely divided aluminum-copper alloy mixed with a small proportion of anhydrous cupric chloride, at a temperature of 200° to 300° C.

2. In the production of an aluminum alkoxide by a catalysed reaction between an alcohol and metallic aluminum, employing anhydrous cupric chloride as the catalyst and supplying the alcohol to the reaction in the vapour state.

3. In a method of preparing an aluminum alkoxide by a catalysed reaction between an alcohol and heated metallic aluminum in a finely divided state, employing anhydrous cupric chloride as the catalyst and supplying the alcohol to the reaction as a vapour carried in a stream of an inert gas.

4. A method of preparing an aluminum alkoxide which comprises reacting the vapour of an alcohol with metallic aluminum in the presence of anhydrous cupric chloride at an elevated temperature.

5. A method of preparing an aluminum alkoxide which consists in reacting the vapour of an alcohol with a finely divided aluminum alloy mixed with a small proportion of anhydrous cupric chloride, at an elevated temperature.

6. In the production of an aluminum alkoxide by a reaction between an alcohol and a material containing an aluminum in the metallic state, which reaction is catalysed by boron trioxide, supplying the alcohol to be reacted in the vapour state.

7. In the preparation of an aluminum alkoxide by reacting together in the presence of boron trioxide an alcohol and metallic aluminum contained in an aluminum alloy, supplying the alcohol to be reacted with the aluminum in its vapour state.

8. A method of preparing an aluminum alkoxide which comprises reacting together an alcohol in the vapour state and a comminuted material containing aluminum in the metallic state in the presence of one of the catalysts boron trioxide and anhydrous cupric chloride.

9. A method of preparing an aluminum alkoxide which comprises reacting vapour of an alcohol with a heated comminuted material containing aluminum in the metallic state, in the presence of one of the catalysts boron trioxide and anhydrous cupric chloride.

10. In a method of preparing an aluminum alkoxide by a reaction between an alcohol and heated metallic aluminum which is catalysed by boron trioxide, supplying the alcohol to the reaction in the form of its vapour.

11. A method of preparing an aluminum alkoxide which comprises reacting vapour of an alcohol with a material containing aluminum in the metallic state in the presence of one of the catalysts boron trioxide and anhydrous cupric chloride, the alcohol being supplied to the reaction as a vapour carried by a stream of an inert gas.

12. In a method of preparing an aluminum alkoxide by a reaction between an alcohol and finely divided metallic aluminum in the presence of one of the catalysts boron trioxide and anhydrous cupric chloride, passing a stream of an inert gas over the aluminum and supplying the alcohol into the said stream in the form of its vapour.

13. In a method of preparing an aluminum alkoxide by a catalysed reaction between an alcohol and finely divided metallic aluminum, the steps of advancing a mixture of the aluminum and one of the catalysts boron trioxide and anhydrous cupric chloride through a reaction space and of passing a stream of the vaporised alcohol through the said space in counter-current to the said mixture.

14. A method of reacting an alcohol with a mixture of finely divided metallic aluminum and a catalyst in order to produce an aluminum alkoxide which comprises utilising anhydrous cupric chloride as the catalyst in the mixture and passing a stream of the alcohol in vapour form over the said mixture while the latter is maintained at an elevated temperature.

15. In a method of preparing an aluminum alkoxide by a catalysed reaction between an alcohol and heated metallic aluminum in a finely divided state, selecting the catalyst from boron trioxide and anhydrous cupric chloride, mixing the catalyst with the aluminum, passing a stream of an inert gas over the aluminum-catalyst mixture, supplying the alcohol in the form of its vapour into the said stream at a point in advance of the contact between the stream and said mixture, and collecting the gaseous stream leaving the mixture with the formed aluminum alkoxide suspended therein.

16. A method of preparing "ion-free" hydrate of alumina which comprises producing an aluminum alkoxide by the method of claim 15 and introducing steam into the gaseous stream leaving the alumium in order to hydrolyse the aluminum alkoxide suspended therein.

17. In a catalytic reaction for producing an aluminum alkoxide from an alcohol and a heated comminuted material containing aluminum in the metallic state, employing anhydrous cupric chloride as the catalyst and entering the alcohol into the reaction in the form of vapour.

ARNOLD C. COATES.
LEONARD SAUNDERS.

REFERENCES CITED

The following references are of record in the file of this patent:

UNITED STATES PATENTS

| Number | Name | Date |
| --- | --- | --- |
| 2,394,848 | Doumani | Feb. 12, 1946 |

OTHER REFERENCES

Tischtschenko: "Chem. Centralblatt," 1900 I, pages 10 to 12.